US011151636B2

(12) United States Patent
Rosenthal

(10) Patent No.: US 11,151,636 B2
(45) Date of Patent: Oct. 19, 2021

(54) AUTOMATICALLY ADJUSTING ORDER FULFILLMENT DUE TO OFFLINE ORDERING

(71) Applicant: VISA INTERNATIONAL SERVICE ASSOCIATION, San Francisco, CA (US)

(72) Inventor: Drew Rosenthal, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 55 days.

(21) Appl. No.: 16/675,652

(22) Filed: Nov. 6, 2019

(65) Prior Publication Data

US 2021/0133856 A1    May 6, 2021

(51) Int. Cl.
*G06Q 30/00* (2012.01)
*G06Q 30/06* (2012.01)
*G06Q 20/36* (2012.01)

(52) U.S. Cl.
CPC ....... *G06Q 30/0635* (2013.01); *G06Q 20/363* (2013.01)

(58) Field of Classification Search
None
See application file for complete search history.

(56) References Cited

U.S. PATENT DOCUMENTS

| 9,398,143 | B1* | 7/2016 | Fullmer | H04W 12/065 |
| 2013/0317921 | A1* | 11/2013 | Havas | G06Q 20/405 |
| | | | | 705/15 |
| 2014/0122198 | A1* | 5/2014 | Cheung | G06Q 30/0207 |
| | | | | 705/14.13 |
| 2014/0330739 | A1* | 11/2014 | Falcone | G06Q 10/08355 |
| | | | | 705/338 |
| 2019/0294128 | A1* | 9/2019 | Delaney | G05B 15/02 |

* cited by examiner

*Primary Examiner* — Mila Airapetian
(74) *Attorney, Agent, or Firm* — Loeb & Loeb LLP

(57) ABSTRACT

A computer-implemented method receives an order request from a consumer device where the order request is be provisioned to a recipient at a later time and where the recipient is required to be physically present receive the order. The order request also includes a request location and a request time. As a function of the information, the method determines an estimated time to complete the order request. The method further sends a confirmation request to the consumer device requesting a confirmation response within a predetermined time. After an expiration of the predetermined time, the method completes a transaction for the order request and receives the confirmation response from the consumer device after the expiration of the predetermined time. The method sends a notification to the consumer device indicating the estimated time to complete the order request for the recipient to receive the order request.

20 Claims, 9 Drawing Sheets

AUTOMATICALLY ADJUSTING ORDER FULFILLMENT DUE TO OFFLINE ORDERING

TECHNICAL FIELD

Embodiments discussed herein generally relate to ordering of services or products when the ordering device is offline.

BACKGROUND

Mobile ordering has enabled consumers to seamlessly purchase their favorite goods or services with just a few clicks. These services work great, but sometimes our daily schedules make things difficult for the merchants or make the purchasing experience unpleasant. For example, unlike a pre-order of goods or services in advance (e.g., booking rides to airport before your departure time or reserving a cake for one's birthday in advance), current on-demand ordering does not take consideration into the time the order is placed, the location of the consumer when ordering the goods or service, the location of the merchant, the distance between the ordering location and the location of the merchant, or a time it takes for the consumer to travel from the ordering location to the location of the merchant.

For example, suppose a consumer is on a public transportation traveling from work to home and would like to pick up food from a restaurant. The consumer didn't pre-order the food, and the consumer also does not wish to wait until arriving at the restaurant. Moreover, the public transportation that the consumer is riding is about to go underground so that the user will lose reception while underground to place the order or respond to an order confirmation. As such, the consumer is missing the opportunity to utilize the loss time in transit to order his or her goods and services are ready when he or she reaches the location of the merchant or that the merchant will be able to deliver the goods or services when the consumer reaches his or her destination.

Therefore, embodiments attempt to create a technical solution to address the deficiencies of the challenges above.

SUMMARY

Embodiments enable a system for the consumer, who places an order before losing connectivity, to provide additional information to the merchant or service provider so that the merchant or service provider may delay the fulfillment of the order until a determined time so that the goods or service is estimated to be ready at the location of the merchant or a place to provision the goods or service.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

Embodiments may now be described more fully with reference to the accompanying drawings, which form a part hereof, and which show, by way of illustration, specific exemplary embodiments which may be practiced. These illustrations and exemplary embodiments may be presented with the understanding that the present disclosure is an exemplification of the principles of one or more embodiments and may not be intended to limit any one of the embodiments illustrated. Embodiments may be embodied in many different forms and should not be construed as limited to the embodiments set forth herein; rather, these embodiments are provided so that this disclosure may be thorough and complete, and may fully convey the scope of embodiments to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

Embodiments enable technical solutions for the consumer, who places an order before losing connectivity, to enjoy a smart ordering system where a particularly configured data packet is sent along with the order request to the merchant so as to assist the merchant or service provider to dynamically delay fulfillment or completion of the order. Aspects of embodiments attempt to ensure that the order will be ready when the consumer is estimated to arrive at the location of the merchant.

Figure 1:
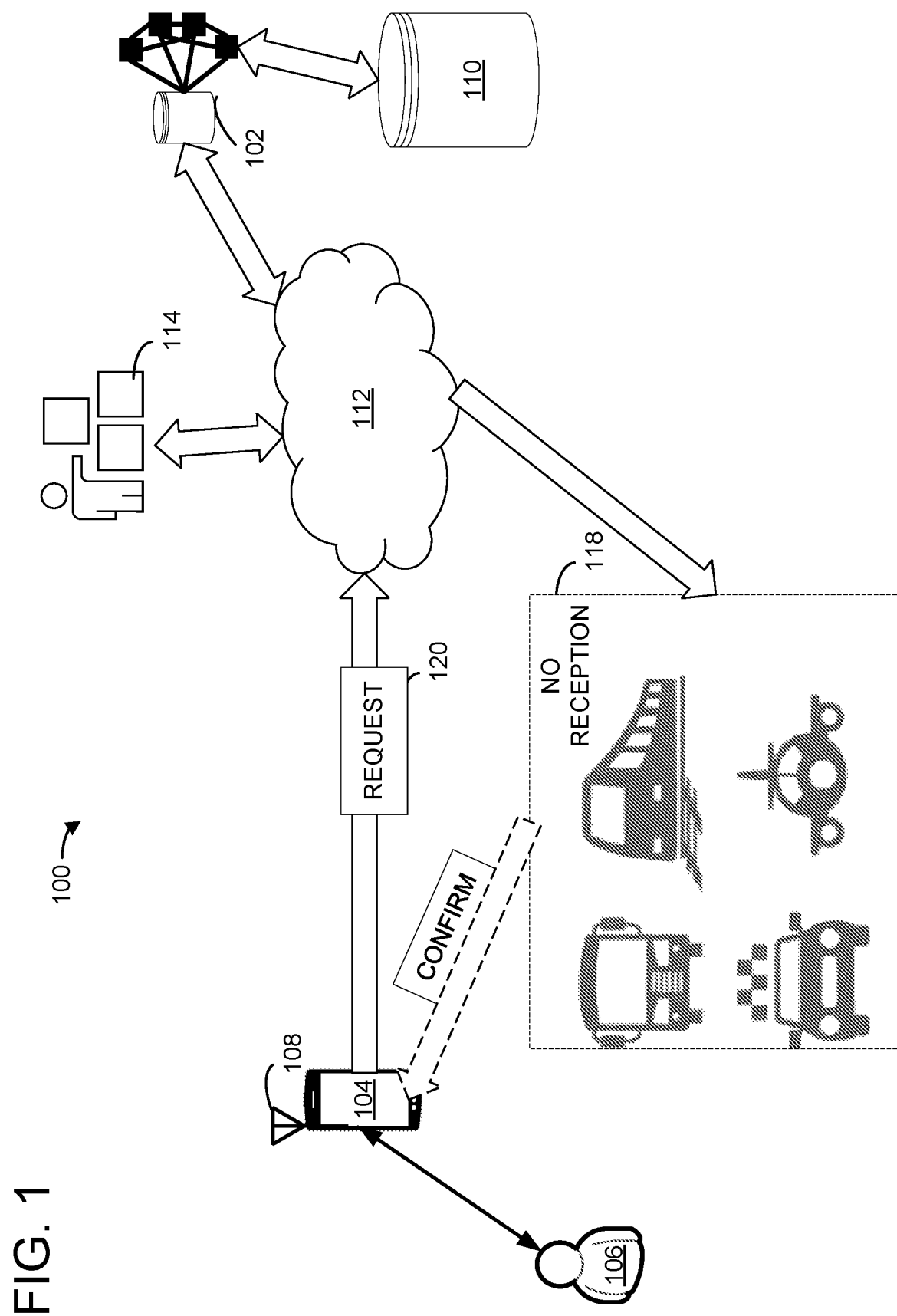
FIG. 1 is a diagram illustrating a system according to one embodiment.

Referring now to FIG. 1, a system diagram 100 illustrates one embodiment. For example, the system 100 may include a server 102 connected to a consumer device 104 of a consumer 106 via a communication channel 112. For example, the server 102 may include one or more remote computing device 841 in FIG. 8 in a distributed arrangement such that the consumer device 104 may gain access to the services of the server 102. In one embodiment, the server 102 may also be connected to a database 110 for storing data that may be needed by the server 102. In one aspect, the database 110 or server 102 may receive data feeds from outside sources such as transit map, transit schedules, flight schedules, weather forecast, traffic information via radio waves, or the like. In another embodiment, the database 110 may be managed by the server 102 or may be shared between the server 102 and a merchant or service provider (hereinafter "merchant" for simplicity) 114. In one example, the merchant 114 may be the merchant location 114. In another example, the merchant 114 may be a location of the service provided. In one instance, the service location may be near an airport even though the "merchant" may be registered or listed in other cities or locations.

In another example, the server 102 may be a payment processing server that handles payment or transaction from the consumer device 104 of the consumer 106 for the merchant 114. In another embodiment, the server 102 may further connect to other devices or entities, such as devices managed by an acquirer or an issuer (not shown) to processor payments from the user 106. In yet another embodiment, the server 102 may be an order processing server handling both payments and order processing on behalf of the merchant 114.

As discussed above, embodiments of the invention enable the consumer 106 to place an order when he had reception but may lose the reception shortly thereafter and as such would not be able to provide any confirmation or a response to the order request. The following are just one or more of the examples how aspects of embodiments may be practiced or used.

Example 1

In one example, the consumer 106 is on a public transportation 118 (e.g., subway or commuter train) and just thought of placing an order request 120 for food that is preferably to be "just made" instead of being stale or "already made" food. As such, he or she would likely use the consumer device 104 to place the order 120. However, she also just realized that the public transportation 118 was able to go underground and an antenna 108 of the consumer device 104 may no longer have reception to wireless connectivity. As such, instead of waiting for the public transportation 118 to resurface to regain reception, the consumer 106 would like to still use the little amount of time left to place the order and take advantage of aspects of the embodiments so that the time without reception is not wasted.

Figure 2:
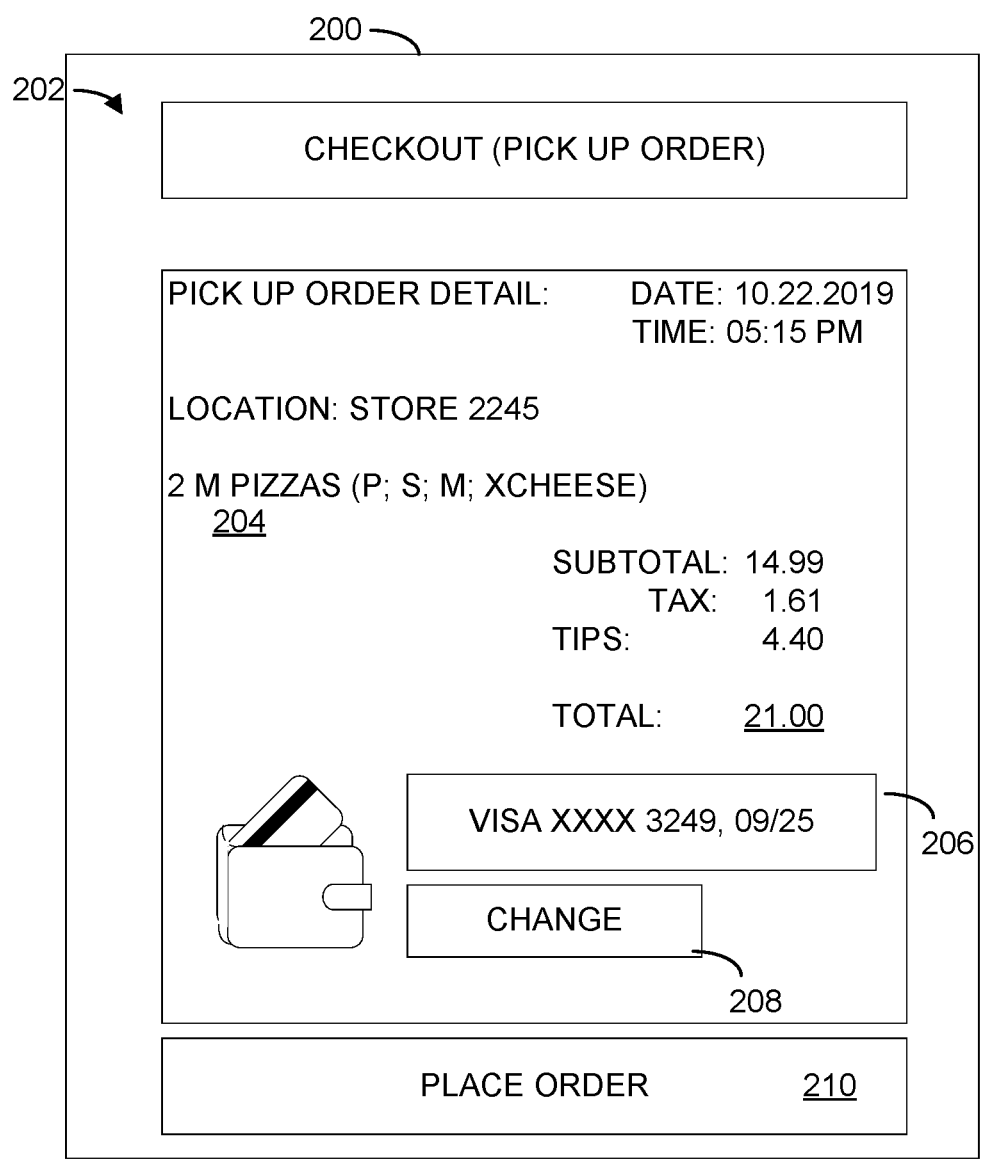
FIGS. 2-5 are graphical user interfaces (GUIs) for an application installed on a user device according to one embodiment.

Referring now to FIG. 2, a graphical user interface (GUI) 200 illustrating an aspect of a delayed fulfillment system. The GUI 200 may be part of an app or application installed on the consumer device 104. In another embodiment, the GUI 200 may be part of a web portal or page rendered on the consumer device 104 via either a browser of the consumer device 104 or via an app. In a further embodiment, the GUI 200 may be part of a digital wallet app installed on the consumer device 104 and that the digital wallet app may be hosted by the server 102. For example, the consumer 106 may have established an account with the server 102 so that the digital wallet app may enable the consumer 106 may log in to her account to retrieve, among other things, her stored payment accounts, her addresses, etc. In yet another embodiment, the GUI 200 may be part of an app of the merchant for receiver order request 120. In such an embodiment, the app may communicate with the consumer device 104 as well as other apps installed thereon (e.g., the digital wallet app) to provide various convenience or services to the consumer 106.

In a further embodiment, the GUI 200 may be rendered to the consumer 106 as a checkout stage (e.g., after the consumer 106 has already selected the items or services the consumer 106 wishes to order). For example, the GUI 200 may include a checkout page 202 for a pickup order with a section 204 showing details of the order. In this embodiment, the consumer 106 also is familiar with the location of the merchant as it may be one of the favorite merchant locations. For example, the section 204 may list the order item(s):

2 medium pizzas with toppings: pepperoni, sausage, mushroom and extra cheese.

The order amount: subtotal of $14.99, tax of $1.61, a tip of $4.40 and a total of $21.00.

The section 204 may also provide the time and date of the order, as well as the location of the merchant 114 (e.g., store 2245). In one embodiment, an actual address of the merchant 114 may be included. Moreover, the section 204 may provide a default payment choice, which may include the last 4 digits of a credit card in a box 206. The consumer 106 may have the option to select a CHANGE button 208 to change the payment method. A separate window or GUI may appear for the consumer to select an alternative payment. In a further example, the consumer 106 may select a PLACE ORDER 210 button to proceed with the order with the merchant 114.

As discussed, up to this stage, the consumer 106 is very familiar with the ordering procedure. Traditionally, once the consumer 106 selects the button 210, the merchant 114 may shortly begin the fulfillment process of making the two pizzas, subject to other orders in queue or in progress, without considering whether the consumer 106 will be there to pick up the order when the pizzas are ready. In addition, current practices focus on the merchant 114 having an oven to warm the pizzas before picked up by the consumer 106. While this may be convenient for the merchant 114 (e.g., it would process the order as soon as possible and reduce waiting time), some consumers may however appreciate or prefer that the order is completed or fulfilled approximately to his or her estimate time of arrival (ETA). For example, certain orders may become stale even though there may be a heating or cooling device to prolong the freshness or readiness of the food (e.g., milk shake or latté).

As such, aspects of embodiments differ from the typical or existing approaches of order fulfillment or completion by providing additional information at the time of the order request 120, since the consumer 106 may about to lose reception for wireless connection shortly after placing the order.

Figure 3:
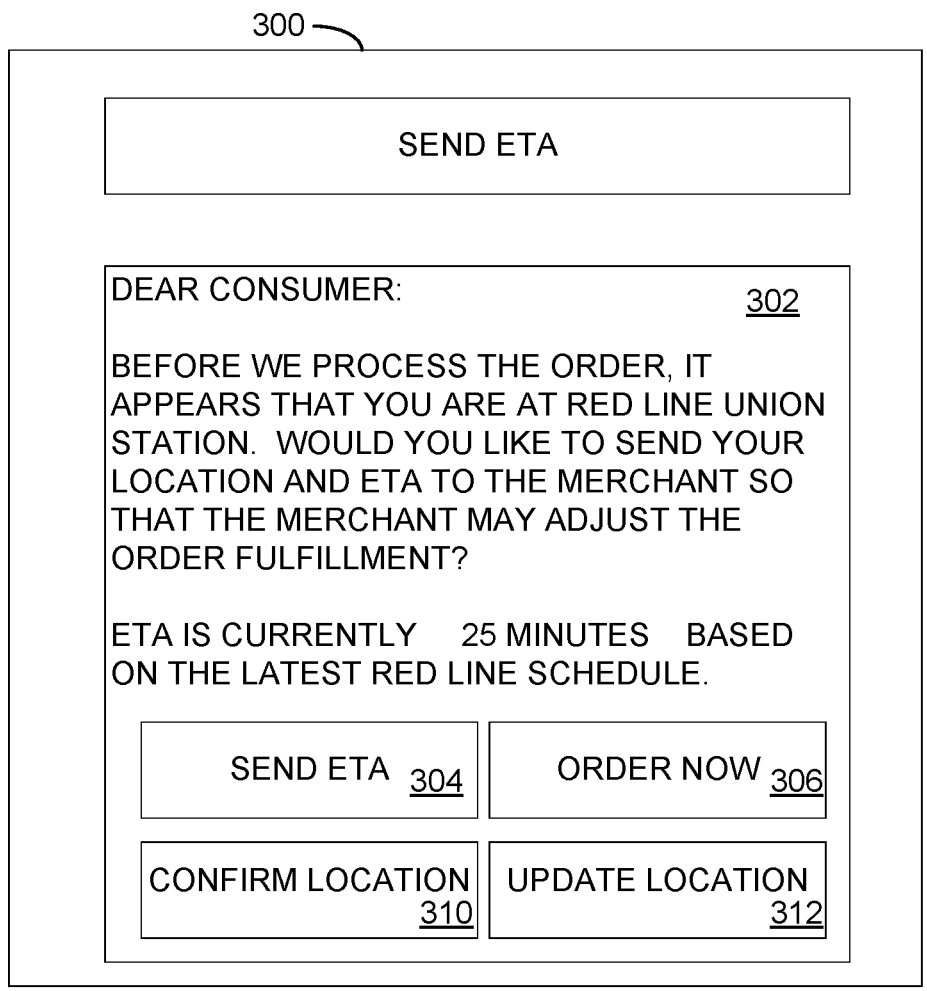

Referring now to FIG. 3, an ETA confirmation GUI 300 may be presented to the consumer device 104. For example a section 302 may indicate to the consumer 106 with a message that:

BEFORE WE PROCESS THE ORDER, IT APPEARS THAT YOU ARE AT RED LINE UNION STATION. WOULD YOU LIKE TO SEND YOUR LOCATION AND ETA TO THE MERCHANT SO THAT THE MERCHANT MAY ADJUST THE ORDER FULFILLMENT?

ETA is currently 25 minutes based on the latest red line schedule.

In response to the notification in the section 302, the consumer may selection a button 304 to "SEND ETA," a button 306 "ORDER NOW," a button 310 "CONFIRM LOCATION," or a button 312 "UPDATE LOCATION."

In one embodiment, the ETA information, for example, is determined or calculated by the server 102 and not sent from the consumer device 104.

For example, the button 306 "ORDER NOW" may represent that the consumer 106 may wish to have the order processed now instead of later based on a delayed fulfillment after determining the ETA. This may be applicable where the consumer 106, while traveling, may be ordering for someone else who is close by the location of the merchant 114 and may pick up the order request 120 without the need for the ETA to be determined.

In another example, the button 310 may enable the consumer 106 to confirm the location or an approximate location of the consumer device 104. In one example, the consumer 106 may be prompted to enable access to GPS or geolocation information of the consumer device 104. For example, the consumer device 104 may include the antenna 108 that may be embedded or connected to semiconductor chips that support GPS or cellular location triangulation algorithms, etc. As such, once activated, the consumer 106 may provide permission to the server 102 to retrieve such information and share it with the merchant 114 during the delayed fulfillment or completion process. In another example, the consumer 106 may also select the button 312 to update the location information. For example, the public transportation 118 may be moving from one location to another when the consumer 106 first places the order and by the time the GUI 300 is presented, the consumer 106 may have traveled to a next station. As such, the GUI 300 may provide an opportunity to the consumer 106 to update the location so that a more accurate ETA may be calculated. In another example, the consumer 106 may need to be rerouted due to road constructions, so having that the button 312 provides an opportunity to update the location information. Once the consumer device 104 has updated the location, the consumer device 104 may have another opportunity to select the button 310.

Figure 4:
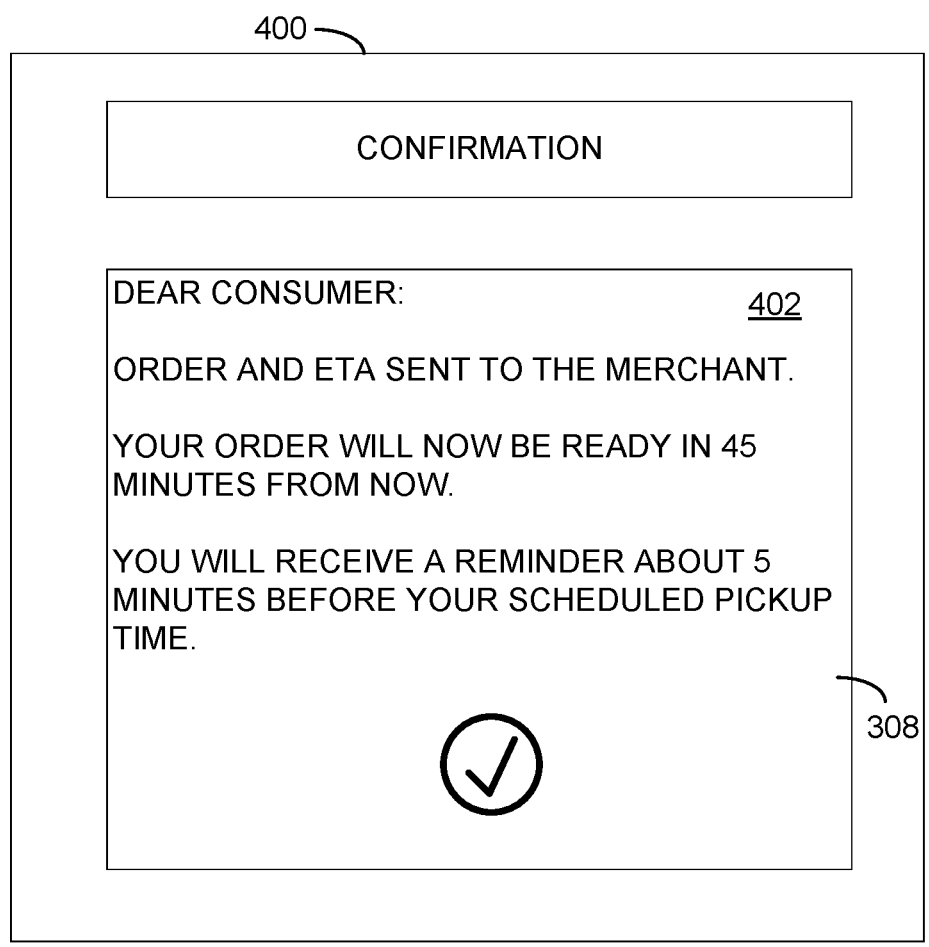

Referring now to FIG. 4, a confirmation GUI 400 may be presented on the consumer device 104. In one embodiment, the GUI 400 may not be rendered on the consumer device 104 right away or immediately if the consumer device 104 has lost reception.

Figure 5:
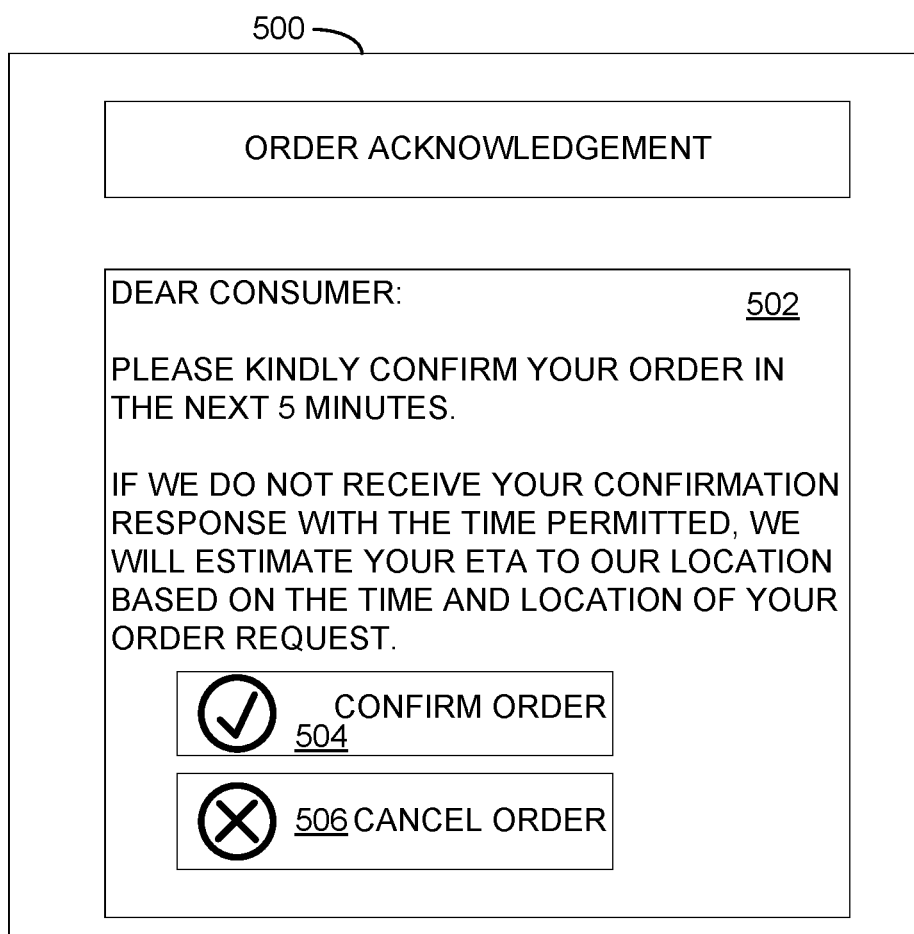

In an alternative embodiment, instead of FIGS. 3 and 4 requesting the consumer 106 to confirm the order, which may be inconvenient since the consumer 106 may be without reception shortly after the order is placed, FIG. 5 may illustrate an alternative embodiment. For example, a message 500 may be sent to the consumer device 106 shortly after the system 100 receives the request 120. The message 500, as an order acknowledgement message, may provide in a section 502 indicating to the consumer 106:

Dear consumer:

Please kindly confirm your order in the next 5 minutes.

If we do not receive your confirmation response with the time permitted, we will estimate your ETA to our location based on the time and location of your order request.

In one embodiment, the permitted time may be shorter and the five minute time was a mere example. In another embodiment, the message 500 may be sent to be presented or displayed in the app. In a further embodiment, the message 500 may be sent in a form of a text message. In yet another embodiment, the message 500 may be sent as an email message. In other words, the message 500 may be sent and presented to the consumer 106 and received by the consumer device 104, but if the consumer 106 does respond to a button 504 to confirm or a button 506 within the permitted time, the system 100 may continue to fulfill the request 120 but with a delayed processing.

In yet another embodiment, the message 500 may include a tracking bit or token sent from the server 102 such that if the message 500 is not rendered or displayed within the permitted time, the tracking bit or token may be flagged or turned on so that the server 102 may know that the message 500 has not been read or displayed. For example, the tracking bit or token may be received by a receiving server (not shown) of the email address or text message associated with the consumer's payment account. The receiving server, based on the tracking bit or token, may process the tracking algorithm or method and respond accordingly back to the server 102.

In another embodiment, as the consumer device 104 may have lost reception with the server 102 or the receiving server after the request 120 was received, the server 102 may record information about the connection or communication channel of the request 120 as a first connection channel. In response to information from the tracking bit or token, the server 102 may record or indicate that the first connection channel has terminated or a session with a connection with the first connection channel has terminated. As such, the server 102 may indicate that the delayed fulfillment or completion of the request 120 may initiate.

Figure 6:
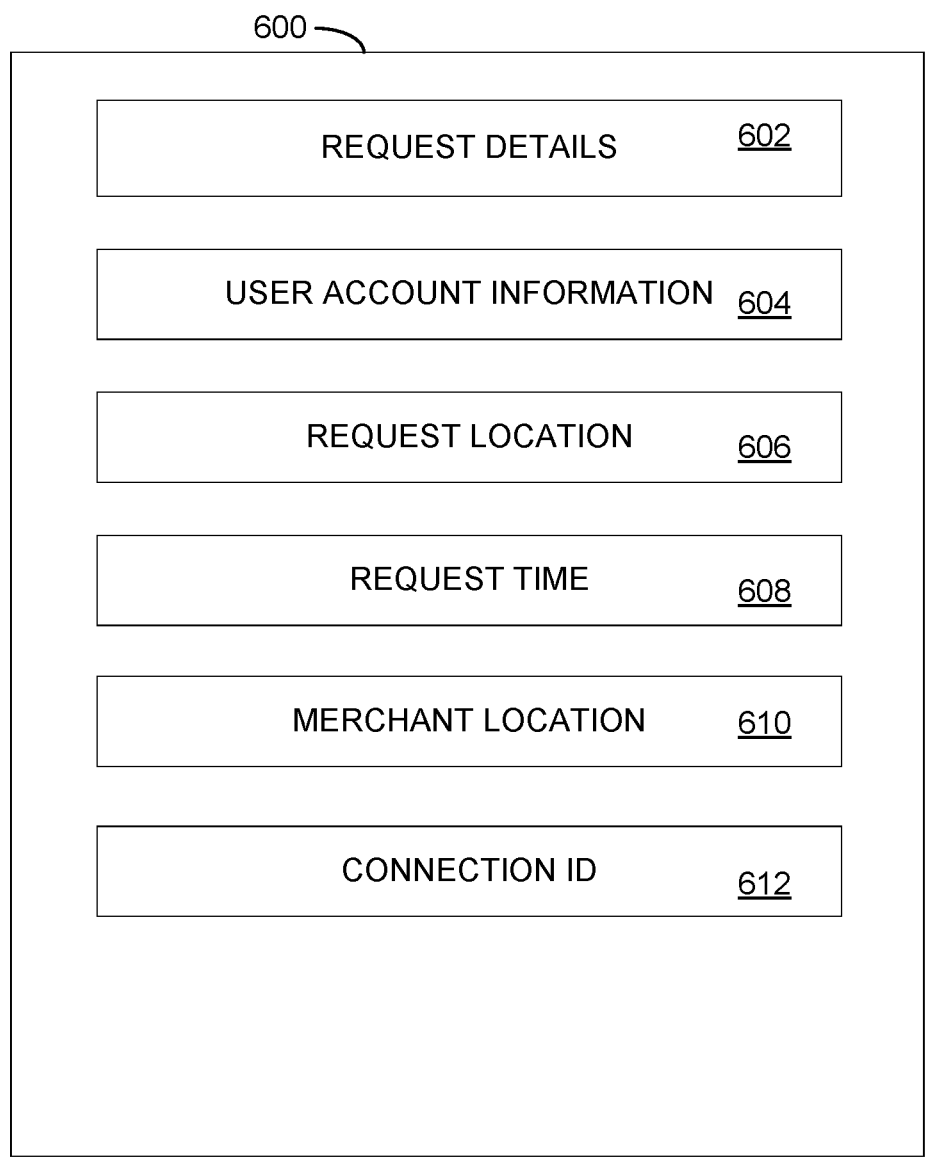
FIG. 6 is a diagram illustrating a tangible non-transitory computer-readable medium storing data according to one embodiment.

Once the server 102 receives the request 120 and the subsequent confirmation or acknowledgement that the delayed fulfillment or completion is activated, the system 100 may ensure that each of the order request 120 may include at least one of the following data in data fields as included in a data structure or data packet in FIG. 6:

Request details in a data field 602;

User account information in a data field 604;

Request location in a data field 606;

Request time in a data field 608;

Merchant location in a data field 610; and

Connection identification in a data field 612.

In other words, the system 100 may ensure that the request 120 includes at the least the information in the structure in FIG. 6 so that the server 102 may perform the necessary triggers and activations. For example, using information from Example 1 above, upon receiving the order request 120 from the consumer 106, the server 102 may determine, based on the request location, request time, the later time, and the request details, that an estimated time to complete or fulfill the order request 120 may be needed. For instance, the estimated time may be calculated based on the distance between the request location and the merchant location; the estimate time of arrival (ETA) of the consumer 106 via a public transportation means; an amount of time needed to complete the order (e.g., pizzas), etc. Unlike the typical "pick up" order of pizzas, current practices ignore the amount of time for the consumer to travel to pick up the order. Despite the app or website of the merchant or restaurant that have found the closest store near the consumer based on the zip code or the GPS location of the device, the current ordering system ignores such information into the calculation when the request will be fulfilled. Moreover, there was no confirmation or request for confirmation from the merchant before initiating the process of the delayed fulfillment because current practices rely on merchant's other hardware to keep the order ready. However, consumers don't enjoy stale food such as a latté or milk shake, a better managed preparation time before pick up time is preferred.

In yet another embodiment, with the example of public transportation above, the server 102 may determine that transportation means based on a variety of factors, such as past spending. In another embodiment, other transportation means may also be determined by past activities. For example, the consumer 106 may be bike to work and once the consumer 106 places the order request 120, the consumer 106 will not likely interact with the consumer device 104 due to safety reasons. As such, the server 102 may determine the ETA based on biking instead of the public transportation.

Example 2

In yet another example, the consumer 106 may be traveling from a first city to a second city and would like to book airport transportation pickup service at the second city. Some existing services would not allow such order despite one has provided arrival flight and arrive time information, due to delays, etc. Some existing services would allow such order, but the consumer 106 would be required to call to a dispatcher at the time of the arrival, despite having received the flight information and flight time from the consumer 106 in advance. In another embodiment, in fulfilling the service, the service provider would require the individual driver to monitor the flight progress and make the initiation to contact the consumer. Since the consumer 106 is in the air (e.g., no reception), the driver may need to call repeatedly before he or she is connected with the consumer 106.

Aspects of embodiments may alleviate such dilemma by identifying the request location, request time, and the service location, and the server 102 may determine an estimated time for completing the request 120. As discussed above, if the consumer 106 fails to respond with a confirmation response, the server 102 may initiate the delayed fulfillment process—the completion or fulfillment of the request is a function of one or more of the following: the request location, the request time, the service location, the ETA, and/or the amount of time to prepare the request goods or services. Using Example 2 above, even though the request is sent from the first city, the server 102 may calculate the estimated air travel time from the first city to the second city, whether there would be any delays due to weather (e.g., public information available). For example, the database 110 may store or link to external information resources such that it may receive information to aid its determination of the estimated time.

Example 3

When the consumer 106 may be travelling to a foreign country, the consumer 106 may not have roaming cellular data service with his or her consumer device 104. As such, the consumer 106 may rely on WI-FI connections at train stations, hotels, coffee houses, etc. Due to the limited range of WI-FI signals, the consumer 106 could not venture too far away from these establishments before losing his or her reception. As such, aspects of embodiments may be useful and convenient when the consumer 106 places an order request when he or she was within WI-FI range (e.g., reserving a dinner reservation). When the server 102 receives the request 120, the server 102 may send a confirmation request. If the consumer 106 fails to respond, the server 102 may trigger the delayed fulfillment. Alternatively, the server 102 may send a change request, asking for a confirmation whether the consumer 106 would agree to the change. Since the consumer 106 may be without reception, after the predetermined time or the loss of the first connection channel, the server 102 may initiate the delayed fulfillment based on the one or more factors or parameters discussed above.

Example 4

Aspects of embodiments may also be applicable when the request is for a service, such as a home delivery. For example, the consumer 106 may be traveling (e.g., in a public transit) and would like to request a home delivery of goods or services to his or her residence. In one instance, such home delivery service may be a catering service, a home pet grooming service, or other personal service. In such an example, the consumer 106 may begin with using an app for the service provider or through a wallet app of the consumer device 104 of the consumer 106 to place the request for the merchant to deliver the service to the consumer's home or work address. Knowing that the consumer 106 may lose reception between his or her current location and the destination and that the merchant most likely will confirm with the consumer 106, either via a phone call or a written electronic message (e.g., a text message or an email message), before accepting the request, embodiments of the invention may come into handy.

In such an example, the system 100 may receive the request 120 from the consumer 106 on behalf of the merchant. As previously discussed, the request 120 may include data information as discussed in FIG. 6 so that the system 100 may determine whether to initiate the delayed completion or the fulfillment of the request 120, such that the service (e.g., delivery to a location other than the merchant location) may be delivered based on the determination.

In another embodiment, it is to be understood that the discussion of public transportation or public transit is intended to be an example only and not by limitation. The consumer 106 may be in a taxi or a ride sharing means of transportation. Moreover, the loss of reception may be another example of a failure to receive confirmation from the merchant. For example, the consumer 106 may not suffer a complete loss of the reception; it may be an intermittent outage or interferences as the consumer 106 travels from one location to another. As such, it is to be understood that the inability for the consumer device 104 to communicate with the server 102 may be caused by a variety of reasons and embodiments are agnostic to the reasons or the causes.

Figure 7:
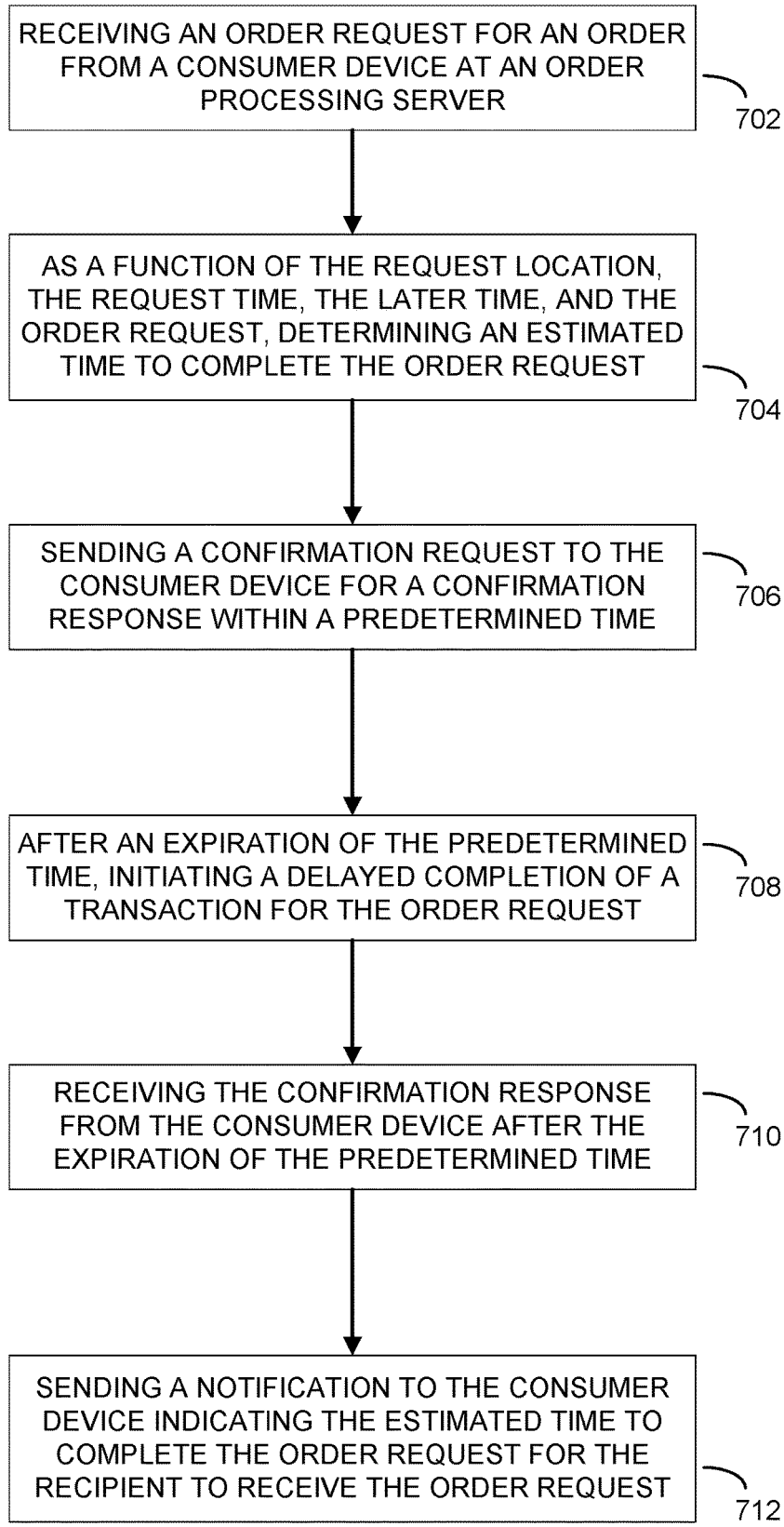
FIG. 7 is a flow diagram illustrating a computer-implemented method for a delayed according to one embodiment.

FIG. 7 is a flow chart illustrating a computer-implemented method for implementing a delayed fulfillment according to one embodiment. For example, at 702, an order processing server (e.g., the server 102) may receive an order request for an order from a consumer device. In one example, the order includes an item or a service to be provisioned to a recipient at a later time where the recipient of the item is required to be physically present at the later time to receive the order request. In another embodiment, the order request may further include a request location and a request time where the order request was sent from the consumer device. At 704, as a function of the request location, the request time, and the order request, the order processing server may determine an estimated time to complete the order request. In a further example, at 706, the order processing server may send a confirmation request to the consumer device for a confirmation response within a predetermined time. After an expiration of the predetermined time, the order processing server may initiate a delayed completion of a transaction for the order request at 708.

The order processing server may receive the confirmation response from the consumer device after the expiration of the predetermined time at 710. At 712, the order processing server may send a notification to the consumer device indicating the estimated time to complete the order request for the recipient to receive the order request.

In a further aspect, after the request 120 is received and that the merchant 114 has provisioned the requested order, the merchant 114 is expected to be compensated or paid. In one example, on a closed loop system (e.g., the wallet app includes funds ready for withdraw), the server 102 may allow for the order to be initiated and check for funds on the payment devices (e.g., credit card or debit card). If funds are not available, it would ask the user to add funds while reception is still available. If funds are available if would complete the transaction. The wallet app may then calculate the expected time of arrival at the merchant's location. Once this is complete, the server 102 may proceed to complete while the consumer is in transit (e.g., offline) to ensure their goods/services are available when they arrive.

On the other hand, in an open loop system, the server 102 may allow for the consumer 106 to place the order as they are beginning their trip and the app may initiate an offline transaction with one or more payment devices on file (e.g., with a default payment) ensuring all processes complete and the order will be ready upon arrival.

Figure 8:
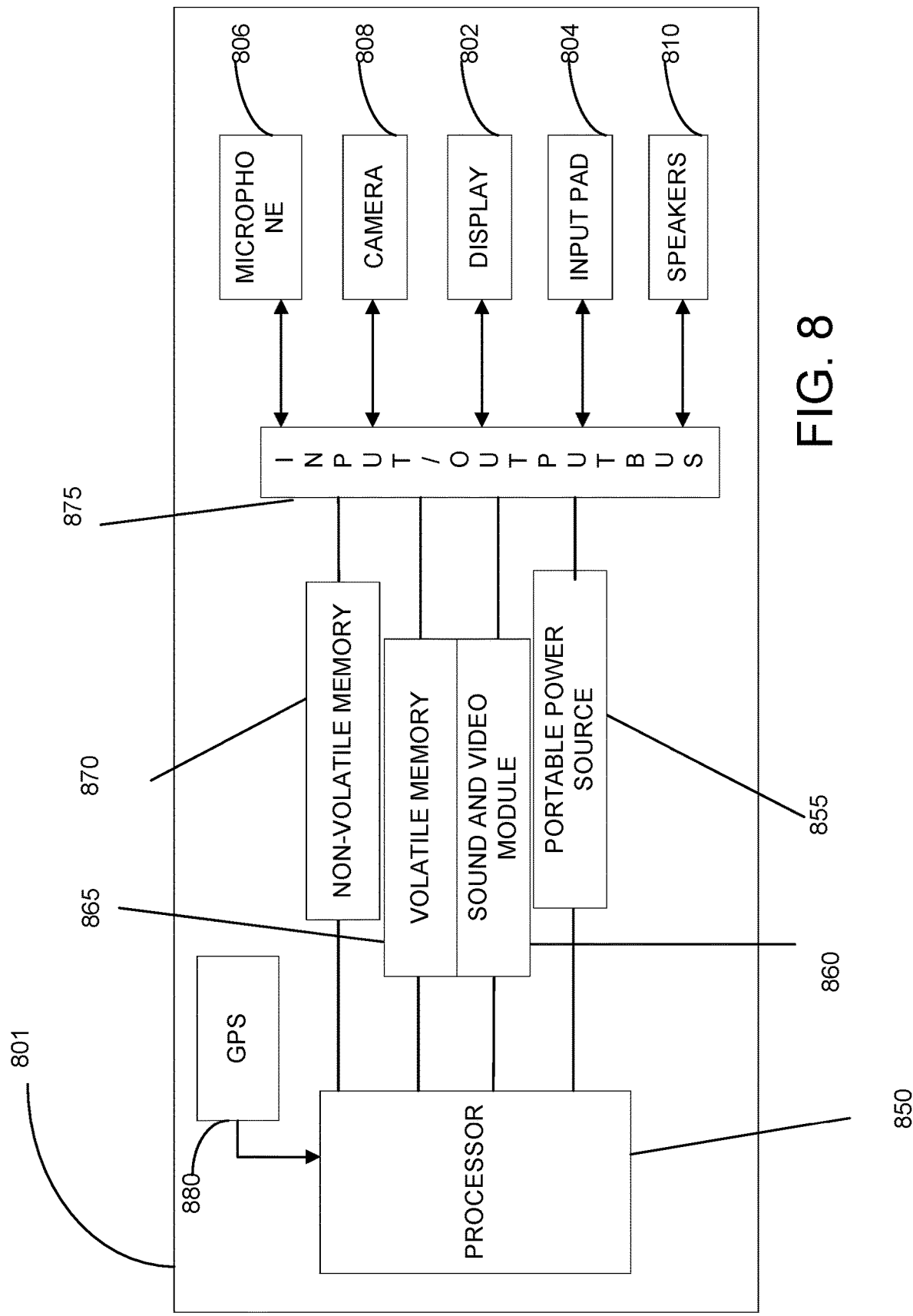
FIG. 8 is a diagram illustrating a portable computing device according to one embodiment.
Figure 9:
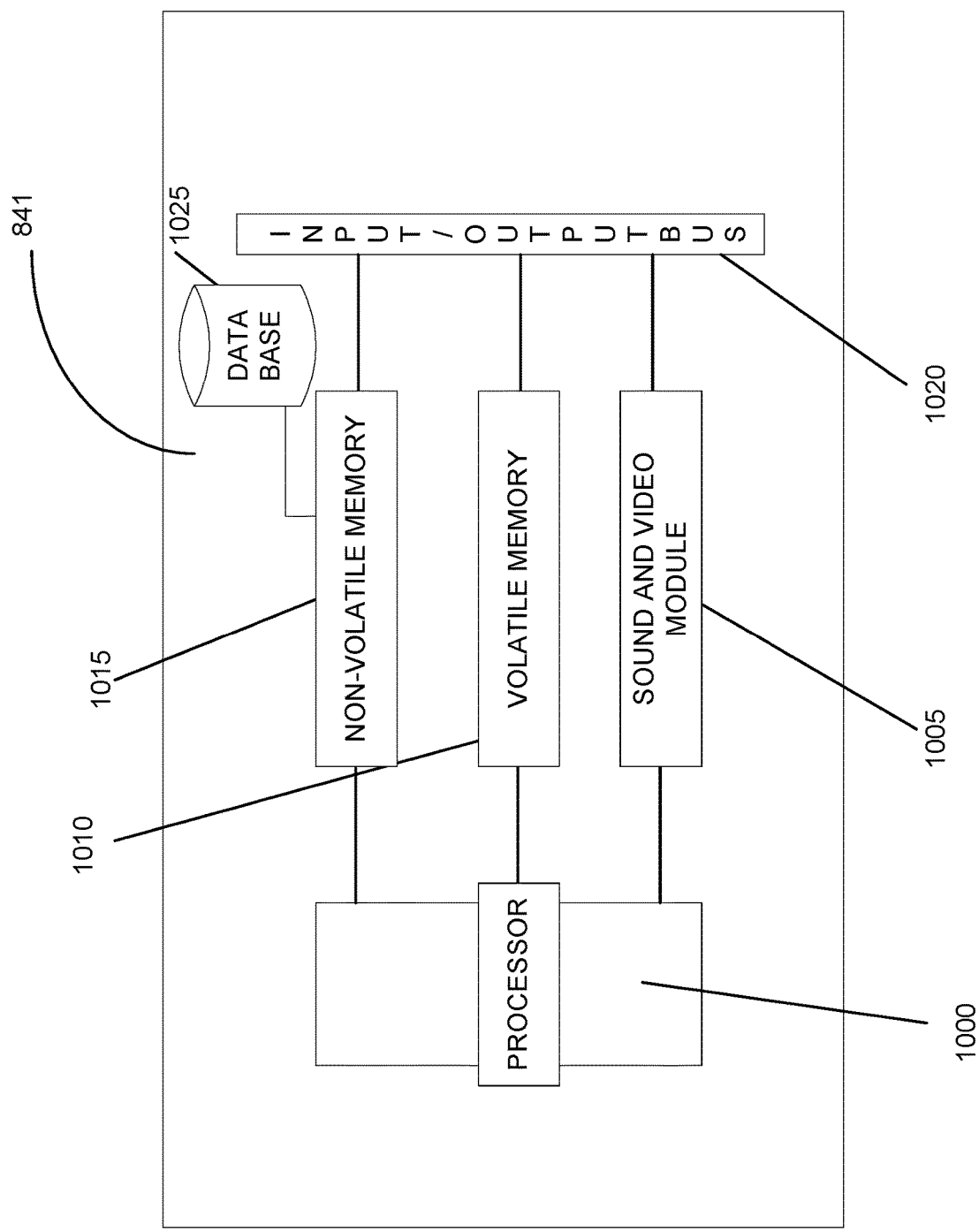
FIG. 9 is a diagram illustrating a computing device according to one embodiment.

FIG. 8 may be a high level illustration of a portable computing device 801 communicating with a remote computing device 841 in FIG. 9 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages and different API platforms.

In one embodiment, a portable computing device 801 may be a mobile device 108 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 841. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi® (802.11 standard), BLUETOOTH, cellular communication or near field communication devices. The communication may be direct to the computing device 841 or may be through a communication network 102 such as cellular service, through the Internet, through a private network, through BLUETOOTH, etc., FIG. 8 may be a simplified illustration of the physical elements that make up a portable computing device 801 and FIG. 9 may be a simplified illustration of the physical elements that make up a server type computing device 841.

FIG. 8 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have non-volatile memory 870 and volatile memory 865. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

The physical elements that make up the remote computing device 841 may be further illustrated in FIG. 9. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of initiating an order with a dynamically delayed delivering or fulfillment window. Embodiments enable the consumer to place an order and that the consumer will be offline until an undetermined time. The order information provide time, location, and estimated time of arrival so as to enable the merchant to fulfill the order at a time that is appropriate.

Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

What is claimed is:

1. A computer-implemented method comprising:
receiving an order request for an order from a consumer device at an order processing server via a computer network, the order comprising an item or a service to be provisioned to a recipient at a later time where the recipient of the item is required to be physically present at the later time to receive the order request, the order request further comprising a request location and a request time where the order request was sent from the consumer device;
as a function of the request location, the request time, and the order request, determining, by the order processing server, an estimated time to complete the order request;
sending, by the order processing server, a confirmation request to the consumer device via a receiving server, the confirmation request including a tracking bit for the receiving server to send a confirmation response to the order processing server within a predetermined time;
after an expiration of the predetermined time:
  automatically activating the tracking bit,
  recording, at the order processing server, that a connection channel of the computer network between the consumer device and the order processing server is terminated based on the activated tracking bit,
  determining an estimated time to complete the order request for the recipient to receive the item or the service based on one or more of the request location and the request time, and
  initiating a delayed completion of a transaction for the order request by the order processing server; and sending, from the order processing server, a notification to the consumer device indicating the estimated time to complete the order request for the recipient to receive the item or the service.

2. The computer-implemented method of claim 1, wherein the notification comprises a first remaining time measuring from the estimated time to a time when the notification was sent.

3. The computer-implemented method of claim 1, wherein the notification comprises a second remaining time measuring from the estimated time to a time when the order request was sent.

4. The computer-implemented method of claim 1, wherein the order request further comprises data of a digital wallet account linked to the consumer device.

5. The computer-implemented method of claim 1, wherein determining the estimated time further comprises:
   retrieving a public transportation schedule based on the request location;
   calculating the estimated time of arrival for the recipient from the request location to a location to receive the item or the service; and
   determining the estimated time as a function of the estimated time of arrival, the request location, the request time, the later time, and the order request.

6. The computer-implemented method of claim 5, wherein the location comprises a favorite location of the recipient.

7. The computer-implemented method of claim 1, further comprising determining, by the order processing server, a funding source before completing the transaction.

8. A tangible non-transitory computer-readable medium having stored thereon computer-executable instructions, said computer-executable instructions comprising:
   receiving an order request for an order from a consumer device via a first connection session at an order processing server via a computer network, the order comprising an item or a service to be provisioned to a recipient at a later time where the recipient of the item is required to be physically present at the later time to receive the order request, the order request further comprising a request location and a request time where the order request was sent from the consumer device;
   as a function of the request location, the request time, and the order request, determining, by the order processing server, an estimated time to complete the order request;
   sending, by the order processing server, a confirmation request to the consumer device for via a receiving server, the confirmation request including a tracking bit for the receiving server to send a confirmation response to the order processing server within a predetermined amount of time;
   after an expiration of the predetermined time:
      automatically activating the tracking bit,
      recording, at the order processing server, that a connection channel of the computer network between the consumer device and the order processing server is terminated based on the activated tracking bit,
      determining an estimated time to complete the order request for the recipient to receive the item or the service based on one or more of the request location and the request time, and
      initiating a delayed completion of a transaction for the order request by the order processing server;
   receiving, by the order processing server, the confirmation response from the consumer device via a second connection session, wherein the first connection session is different from the second connection session; and
   sending, from the order processing server, a notification to the consumer device indicating the estimated time to complete the order request for the recipient to receive the item or the service.

9. The tangible non-transitory computer-readable medium of claim 8, wherein the notification comprises a first remaining time measuring from the estimated time to a time when the notification was sent.

10. The tangible non-transitory computer-readable medium of claim 8, wherein the notification comprises a second remaining time measuring from the estimated time to a time when the order request was sent.

11. The tangible non-transitory computer-readable medium of claim 8, wherein the order request further comprises data of a digital wallet account linked to the consumer device.

12. The tangible non-transitory computer-readable medium of claim 8, wherein determining the estimated time further comprises:
   retrieving a public transportation schedule based on the request location;
   calculating the estimated time of arrival for the recipient from the request location to a location to receive the item or the service; and
   determining the estimated time as a function of the estimated time of arrival, the request location, the request time, the later time, and the order request.

13. The tangible non-transitory computer-readable medium of claim 12, wherein the location comprises a favorite location of the recipient.

14. The tangible non-transitory computer-readable medium of claim 8, further comprising determining, by the order processing server, a funding source before completing the transaction.

15. A system comprising:
   a communications channel for establishing a connection with a consumer device;
   a processor, connecting to the consumer device via the communications channel, configured to execute computer-executable instructions for:
   receiving an order request for an order from a consumer device via a first connection session at an order processing server via a computer network, the order comprising an item or a service to be provisioned to a recipient at a later time where the recipient of the item is required to be physically present at the later time to receive the order request, the order request further comprising a request location and a request time where the order request was sent from the consumer device;
   as a function of the request location, the request time, and the order request, determining, by the order processing server, an estimated time to complete the order request;
   sending, by the order processing server, a confirmation request to the consumer device for via a receiving server, the confirmation request including a tracking bit for the receiving server to send a confirmation response to the order processing server within a predetermined amount of time;
   after an expiration of the predetermined time:
      automatically activating the tracking bit,
      recording, at the order processing server, that a connection channel of the computer network between the consumer device and the order processing server is terminated based on the activated tracking bit, determining an estimated time to complete the order request for the recipient to receive the item or the service based on one or more of the request location and the request time, and initiating a delayed completion of a transaction for the order request by the order processing server;

receiving, by the order processing server, the confirmation response from the consumer device via a second connection session, wherein the first connection session is different from the second connection session; and sending, from the order processing server, a notification to the consumer device indicating the estimated time to complete the order request for the recipient to receive the item or the service.

16. The system of claim 15, wherein the notification comprises a first remaining time measuring from the estimated time to a time when the notification was sent.

17. The system of claim 15, wherein the notification comprises a second remaining time measuring from the estimated time to a time when the order request was sent.

18. The system of claim 15, wherein determining the estimated time further comprises:
- retrieving a public transportation schedule based on the request location;
- calculating the estimated time of arrival for the recipient from the request location to a location to receive the item or the service; and
- determining the estimated time as a function of the estimated time of arrival, the request location, the request time, the later time, and the order request.

19. The system of claim 15, wherein the location comprises a favorite location of the recipient.

20. The system of claim 15, wherein the processor is further configured to determine a funding source before fulfilling the transaction.

* * * * *